United States Patent [19]

Stroup

[11] 3,945,821

[45] Mar. 23, 1976

[54] BEARING HAVING EXTENDED ROLLING FATIGUE LIFE

[75] Inventor: James P. Stroup, Ligonier Township, Westmoreland County, Pa.

[73] Assignee: Latrobe Steel Company, Latrobe, Pa.

[22] Filed: June 24, 1974

[21] Appl. No.: 482,265

[52] U.S. Cl. ............... 75/126 C; 75/126 E; 148/36
[51] Int. Cl.² .................. C22C 38/22; C22C 38/24
[58] Field of Search ......... 75/126 C, 126 E; 148/36; 24/149.5 R

[56] References Cited
UNITED STATES PATENTS

| | | | |
|---|---|---|---|
| 2,159,086 | 5/1939 | Houdremont et al. | 75/126 E |
| 3,012,879 | 12/1961 | Schempp | 75/126 C |
| 3,114,630 | 8/1960 | Steven et al. | 75/126 E |
| 3,295,966 | 1/1967 | Steven | 75/126 C |

OTHER PUBLICATIONS

"Tool Steels," 3rd Ed., 1962, pp. 421–422.
"Tool Steels," 3rd Ed., 1962, pp. 226–237.

*Primary Examiner*—C. Lovell
*Assistant Examiner*—Arthur J. Steiner
*Attorney, Agent, or Firm*—Buell, Blenko & Ziesenheim

[57] ABSTRACT

This invention provides bearing parts and a bearing steel characterized by rolling contact fatique life many times that of bearing parts and steels now in use. The steel composition is broadly about 0.7 to 1.0% carbon, up to 0.50% silicon, up to 0.50% manganese, about 3.75 to 4.75% molybdenum about 3.75 to 4.50% chromium, about 0.20 to 1.00% vanadium and the balance iron with usual impurities in ordinary amounts.

2 Claims, No Drawings

BEARING HAVING EXTENDED ROLLING FATIGUE LIFE

This invention relates to bearings and bearing steels and particularly to bearings and bearing steels which provided multifold improvements in rolling contact fatigue life over bearings and bearing steels heretofore available.

The problems associated with bearing break-down over long periods of use such as in the gas turbine engines used in modern jet aircraft are well known and recognized in the industry. One of the most serious of these problems is the problems of rolling contact fatigue resulting in failure of bearings and bearing races. Balls and races of bearings which do not fail for mechanical reasons, i.e., break-down in the lubricating system, bad design, etc., will normally fail in fatigue caused by the moving parts of the bearing rolling against one another under force. Even many failures caused by mechanical reasons will manifest themselves as rolling contact fatigue failure. Since this type of failure is unrelated to any of the recognized mechanical break-downs it is difficult to anticipate and detect in time to avoid failures. It is therefore highly important to be able to (1) measure rolling contact fatigue and (2) provide bearings which have improved contact fatigue properties. From the standpoint of design improved rolling contact fatigue life permits greater safety margins and/or longer run times before preventive maintenance overhauls are necessary. In newer aircraft gas turbine engines which are much more expensive to build and require longer life guarantees, this is of considerable importance.

Rolling contact fatigue is measured by a number of different methods, all of which embody the following common parameters. Two or more metal samples (at least one being the material of interest) in the form of balls, cylinders, discs etc. are caused to roll against one another under a relatively high imposed load on the contact surfaces. Lubrication of some type is provided at the contact surfaces. Rolling contact is continued under the above conditions at many cycles per minute until a fatigue crack or spall develops in the surface of the material under test. (The test units are designed so that the material of interest fails first thus providing the desired data.) Testing of a sample material will involve at least ten and generally more individual rolling contact fatigue tests as described above. Upon completion, the cyclic life values will be plotted as a cumulative frequency curve (commonly called a Weibull plot) and $B_{10}$, $B_{50}$ etc. points picked off the curve. The $B_{10}$ value is that life below which 10% of the failures are expected to occur in a large population. Likewise the $B_{50}$ value is the median or the life below which 50% of the failures are expected to occur in a large population.

I have invented a bearing and bearing steel which provides markedly improved resistance to contact fatigue and is much superior to the steels now used for this purpose. The steel presently used for the most severe bearing uses is that known as M50. This steel is the alloy primarily used at the present time in flying gas turbine bearings and will be used as the basis for comparison in this specification.

In this invention I provide a bearing formed from and a bearing steel whose broad composition is:

| | |
|---|---|
| Carbon | 0.7 – 1.0 |
| Silicon | up to 0.50 |
| Manganese | up to 0.50 |
| Chromium | 3.75 – 4.50 |
| Molybdenum | 3.75 – 4.75 |
| Vanadium | 0.20 – 1.00 |
| Iron | balance with usual impurities in ordinary amounts |

A narrower preferred composition is:

| | |
|---|---|
| Carbon | 0.9 – 1.0 |
| Silicon | 0.15 – 0.25 |
| Manganese | 0.20 – 0.35 |
| Chromium | 4.00 – 4.25 |
| Molybedenum | 4.00 – 4.25 |
| Vanadium | 0.50 – 0.70 |
| Iron | balance with usual impurities in ordinary amounts |

The single preferred composition is:

| | |
|---|---|
| Carbon | 0.95 |
| Silicon | 0.20 |
| Manganese | 0.30 |
| Chromium | 4.15 |
| Molybdenum | 4.15 |
| Vanadium | .55 |
| Iron | balance with usual impurities in ordinary amounts |

In order to achieve the maximum improvement in rolling contact fatigue the steel may be heat treated by either of the following procedures:

I

Preheat 1500–1550°F/6 min. at temp.
Austenitize in salt 2000°F/3 min. at temp.
Quench in salt 1050°F., air cool
Temper 1000°F/2 hrs./air cool

II

Preheat 1500°F/6 min. at temp.
Austenitize in salt 2125°F/3 min. at temp.
Quench in salt 1000°F., oil quench
Sub zero treat −100°F/15 min.
Temper 1000°F/2 hrs./air cool
Sub zero treat −100°F/15 min.
Temper 1000°F/2 hrs./air cool
Sub zero treat −100°F/15 min.
Temper 975°F/2 hrs./air cool The present invention can perhaps be best understood by reference to the following examples of steels with varying carbon and vanadium concentrations in the same base matrix of about 0.20% silicon, 0.30% manganese, 4.15% chromium, 4.15% molybdenum and balance iron with usual minor impurities.

| Heat | C w/o | V w/o | $B_{10}$ (×10$^6$) | $B_{50}$(×10$^6$) | $R_c$ |
|---|---|---|---|---|---|
| 1 | .83 | 1.00 | 2.0 | 6.0 | 62 |
| 2 | .87 | .88 | 3.0 | 7.7 | 65.1 |
| 3 | .73 | .20 | 5.2 | 9.8 | 62.8 |
| 4 | .95 | .50 | 8.9 | 20.3 | 64.2 |
| 5 | .88 | .95 | 2.4 | 7.8 | 64.9 |
| 6 | .80 | .45 | 3.4 | 7.3 | 63.0 |
| 7 | .85 | .55 | 3.7 | 13.2 | 64.3 |
| 8 | .90 | .43 | 3.4 | 11.6 | 64.4 |
| 9 | .93 | .45 | 4.2 | 10.7 | 64.3 |
| 10 | .96 | .54 | 6.3 | 16.6 | 63.8 |

Note:
Heats 1 through 4 were heat treated with heat treatment No. I. Heats 5 through 10 were done with heat treatment No. II.

The foregoing data show the significantly improved rolling fatigue life to be obtained by controlling the composition within the limits herein set out.

Alloys 1 and 5 are standard M50 and show rolling contact fatigue lives at $B_{10}$ of $2.0 \times 10^6$ and $2.4 \times 10^6$ respectively. Alloys 4 and 10 represent the preferred analysis of the invention and have $B_{10}$ valves of $8.9 \times 10^6$ and $6.3 \times 10^6$, respectively. This represent a 2.5 to 4 fold improvement over the standard M50 analysis. Other alloy compositions within the patent, namely alloys 2,3,6,7,8 and 9, show significant improvements over the M50, but not as great as those shown for Alloys 4 and 10, the preferred composition.

In the foregoing specifications I have set out certain preferred practices and embodiments of my invention, however, it will be understood that this invention may be otherwise embodied within the scop of the following claims.

I claim:

1. A bearing part subject to rolling pressure and characterized by rolling fatigue life exceeding that of M50 steel by at least 2 times and formed from a steel consisting essentially of about 0.9 to 1.0% carbon, about 0.15 to 0.25% silicon, about 0.20 to 0.35% manganese, about 4.00 to 4.25% chromium, about 4.00 to 4.25% molybdenum, about 0.50 to 0.70% vanadium and the balance iron with usual impurities in ordinary amounts.

2. A bearing part as claimed in claim 1 consisting essentially of about 0.95% carbon, about 0.20% silicon, about 0.30% manganese, about 4.15% chromium, about 4.15% molybdenum, about 0.55% vanadium and the balance iron with usual impurities in ordinary amounts.

* * * * *